(12) United States Patent
Park

(10) Patent No.: US 7,286,330 B2
(45) Date of Patent: Oct. 23, 2007

(54) POWER SUPPLY DEVICE AND METHOD HAVING A SPARK PREVENTION FUNCTION

(75) Inventor: Cheol-jin Park, Suwon (KR)

(73) Assignee: Samaung Electronics Co., Ltd., Suwon (KR)

( * ) Notice: Subject to any disclaimer, the term of this patent is extended or adjusted under 35 U.S.C. 154(b) by 428 days.

(21) Appl. No.: 10/654,931

(22) Filed: Sep. 5, 2003

(65) Prior Publication Data

US 2004/0066662 A1   Apr. 8, 2004

(30) Foreign Application Priority Data

Oct. 2, 2002   (KR) .................. 10-2002-0060046

(51) Int. Cl.
*H02H 9/08* (2006.01)

(52) U.S. Cl. ........................................ 361/42

(58) Field of Classification Search .............. 361/42, 361/103, 111; 323/222, 212; 363/21.01, 363/21.09
See application file for complete search history.

(56) References Cited

U.S. PATENT DOCUMENTS

| 3,729,673 | A | * | 4/1973 | Schneider | .................. 323/258 |
|---|---|---|---|---|---|
| 5,214,369 | A | * | 5/1993 | McCrea | ..................... 320/143 |
| 5,278,748 | A | | 1/1994 | Kitajima | |
| 6,161,027 | A | * | 12/2000 | Poirel | ......................... 455/572 |
| 6,320,766 | B1 | * | 11/2001 | Park | ........................ 363/21.09 |
| 6,678,131 | B2 | * | 1/2004 | Chapman et al. | ............. 361/42 |
| 6,902,412 | B2 | * | 6/2005 | Higgins | ..................... 439/101 |
| 6,903,945 | B2 | * | 6/2005 | Kitano | .................... 363/21.01 |

FOREIGN PATENT DOCUMENTS

JP   09-172734 A   6/1997
KR   2002-0011017 A   2/2002

* cited by examiner

*Primary Examiner*—Michael Sherry
*Assistant Examiner*—Boris Benenson
(74) *Attorney, Agent, or Firm*—Sughrue Mion Pllc.

(57) ABSTRACT

Disclosed is power supply device and method having a spark prevention function. The power supply device having a spark prevention function includes output connectors to which an external device is coupled to be supplied with electric power; and an output controller for controlling a level of a voltage outputted to the output connectors depending upon whether the external device is coupled to the output connectors. Accordingly, damages to parts and malfunctions due to spark occurrences can be prevented, so an external device can be coupled to a power supply device in operation without any damage.

11 Claims, 2 Drawing Sheets

POWER SUPPLY DEVICE AND METHOD HAVING A SPARK PREVENTION FUNCTION

BACKGROUND OF THE INVENTION

This application claims the priority of Korean Patent Application No. 2002-0060046, filed on Oct. 2, 2002, in the Korean Intellectual Property Office, the disclosure of which is incorporated herein in its entirety by reference.

1. Field of the Invention

The present invention relates to a power supply device and a method having a spark prevention function, and more particularly, to a power supply device and a method capable of preventing sparks occurring in situations when an external device is connected to the power supply device in operation.

2. Description of the Prior Art

Power supply devices refer to devices supplying power to external devices connected thereto. Such power supply devices include a rectifier for obtaining direct current (DC) voltages by smoothing currents from an external alternating current (AC) power source, an uninterruptible power supply (UPS) for continuously supplying AC electric power of good quality to external devices against power failure, short power outage, voltage fluctuation, frequency fluctuation, and so on, and a frequency converter capable of providing diverse voltages or frequencies at any values by using a microprocessor and the like.

FIG. 1 is a view for illustrating a conventional power supply device.

Referring to FIG. 1, a power supply device has a filter 12, a rectifier 14, a field effect transistor (FET) 16, a switching controller 18, a transformer 20, a output rectifier 22, a feedback circuit 24, output connectors 26, and so on.

The filter 12 supplies AC power to the rectifier 14, eliminating surge and noise voltages flowing in from an AC power source 10, and the rectifier 14 is constructed with bridge diodes D1, D2, D3, and D4 and a capacitor C1 and rectifies an AC power inputted from the AC power source 10. A voltage rectified by the rectifier 14 is applied to a primary coil of the transformer 20, and the transformer 20 induces a voltage across a secondary coil thereof through interactions of the primary and secondary coils. At this time, the FET 16 is turned on and off by the controls of the switching controller 18 so that currents flowing in the primary coil of the transformer 20 are controlled, to thereby control the induction of a voltage across the secondary coil of the transformer 20. A voltage induced in the second coil of the transformer 20 is rectified and smoothened in the output rectifier 22 so that a DC voltage is finally outputted through the output connectors 26. At this time, the feedback circuit 24 detects an output voltage of the output rectifier 22 and feeds back the detected output voltage to the switching controller 18, and the switching controller 18 controls switching operations based on the fed-back voltage to constantly maintain the output voltage.

However, if an external device is connected to the output connectors 26 during the operations of the power supply device, a large amount of current instantly flows since a normal output voltage of certain level is outputted across the output connectors 26 and the external device connected to the output connectors 26 has a voltage of lower level than the normal output voltage. In this situation, a contact resistance value between the output connectors 26 and the external device increases since a contact area therebetween is considerably small. Therefore, a voltage becomes large with the abrupt current increase and the resistance value increase, and power instantly consumed is increased due to the increased voltage and current, which generates sparks or arc. Such spark occurrences lead the power supply device and the external device to malfunctions, and, further, damages to parts, fires in a worse case, and so on are likely to occur due to spark heat of high energy and the like.

Accordingly, in order to connect an external device to a power supply device in operation, first, the operations of the power supply device are halted to lower a voltage level outputted to the output connectors 26, and, second, the power supply device is turned on after the external device is connected to the output connectors 26, which causes inconvenience.

SUMMARY OF THE INVENTION

The present invention has been devised to solve the above problem, so it is an object of the present invention to provide a power supply device and a method having a spark prevention function, capable of preventing sparks from occurring when the external device is connected to output connectors of the power supply device in operation by connecting an external device to the power supply device without stopping the operations of the power supply device.

In order to achieve the above object, a power supply device having a spark prevention function according to the present invention comprises output connectors to which an external device is coupled to be supplied with electric power; and an output controller for controlling a level of a voltage outputted to the output connectors depending upon whether the external device is coupled to the output connectors.

The output controller in an exemplary embodiment, controls an output of a normal output voltage of certain level to the output connectors after the external device is coupled, and controls an output of a voltage of lower level than the normal output voltage.

In more detail, the output controller includes a load detector for deciding whether the external device is coupled to the output connectors; plural resistors connected in series to one other, and both ends of which are connected in parallel with the output connectors; and a voltage-regulated switch for controlling at least one of the plural resistors to be short-circuited based on a result of the decision of the load detector.

Meanwhile, a power supply method having a spark prevention function according to the present invention comprises steps of deciding whether an external device is coupled to output connectors supplying electric power; and controlling a level of a voltage outputted to the output connectors based on a result of the decision of the decision step.

Further, the step of controlling the voltage level in an exemplary embodiment, controls an output of a normal output voltage of certain level to the output connectors after the external device is coupled, and controls an output of a voltage of lower level than the normal output voltage to the output connectors before the external device is coupled.

Hereafter, the present invention will be described in detail with reference to the accompanying drawings.

BRIEF DESCRIPTION OF THE DRAWINGS

The invention will be described in detail with reference to the following drawings in which like reference numerals refer to like elements, and wherein.

DETAILED DESCRIPTION OF AN EXEMPLARY EMBODIMENT

Figure 1:
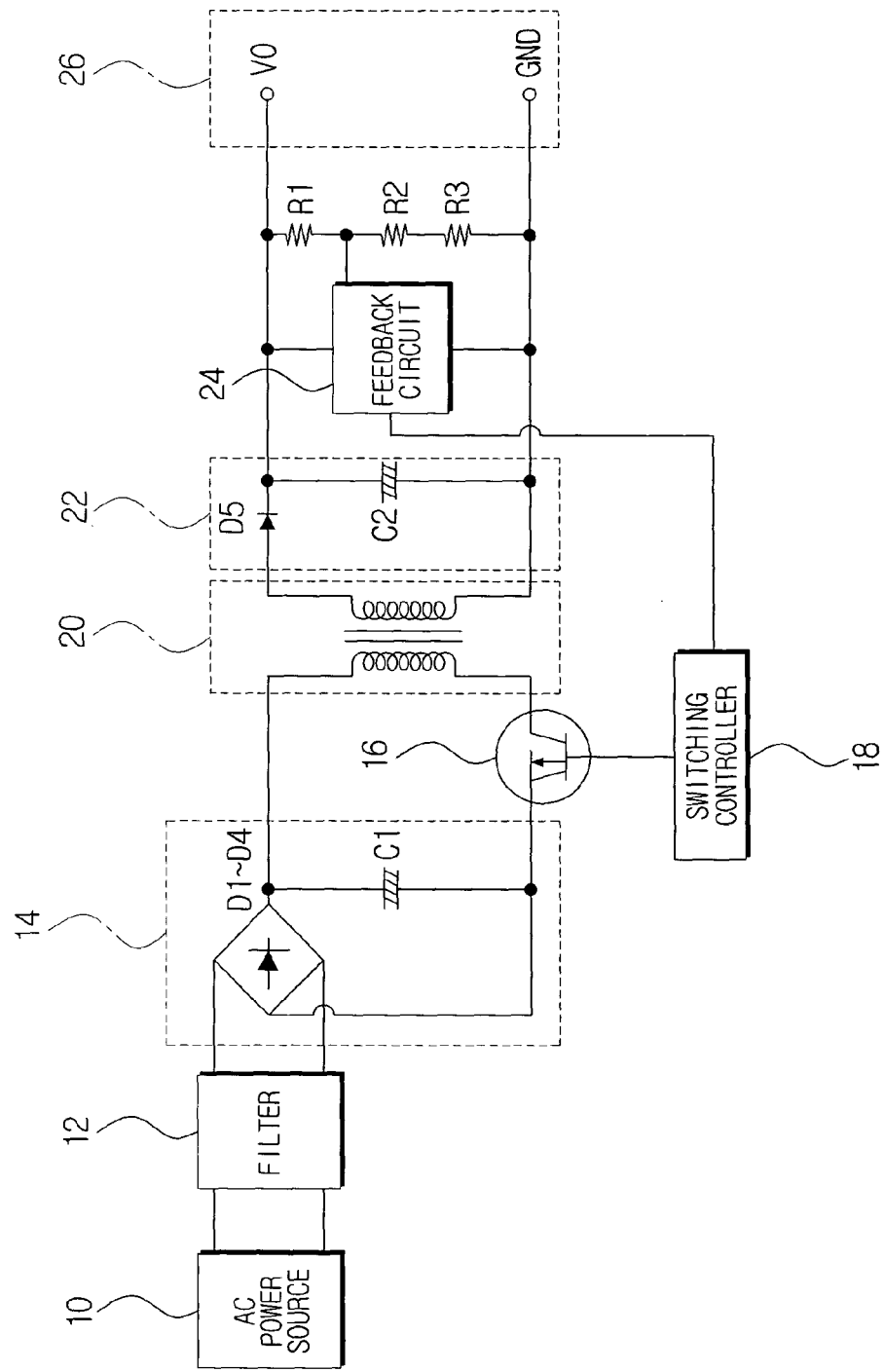
FIG. 1 is a block diagram for illustrating a conventional power supply device.
Figure 2:
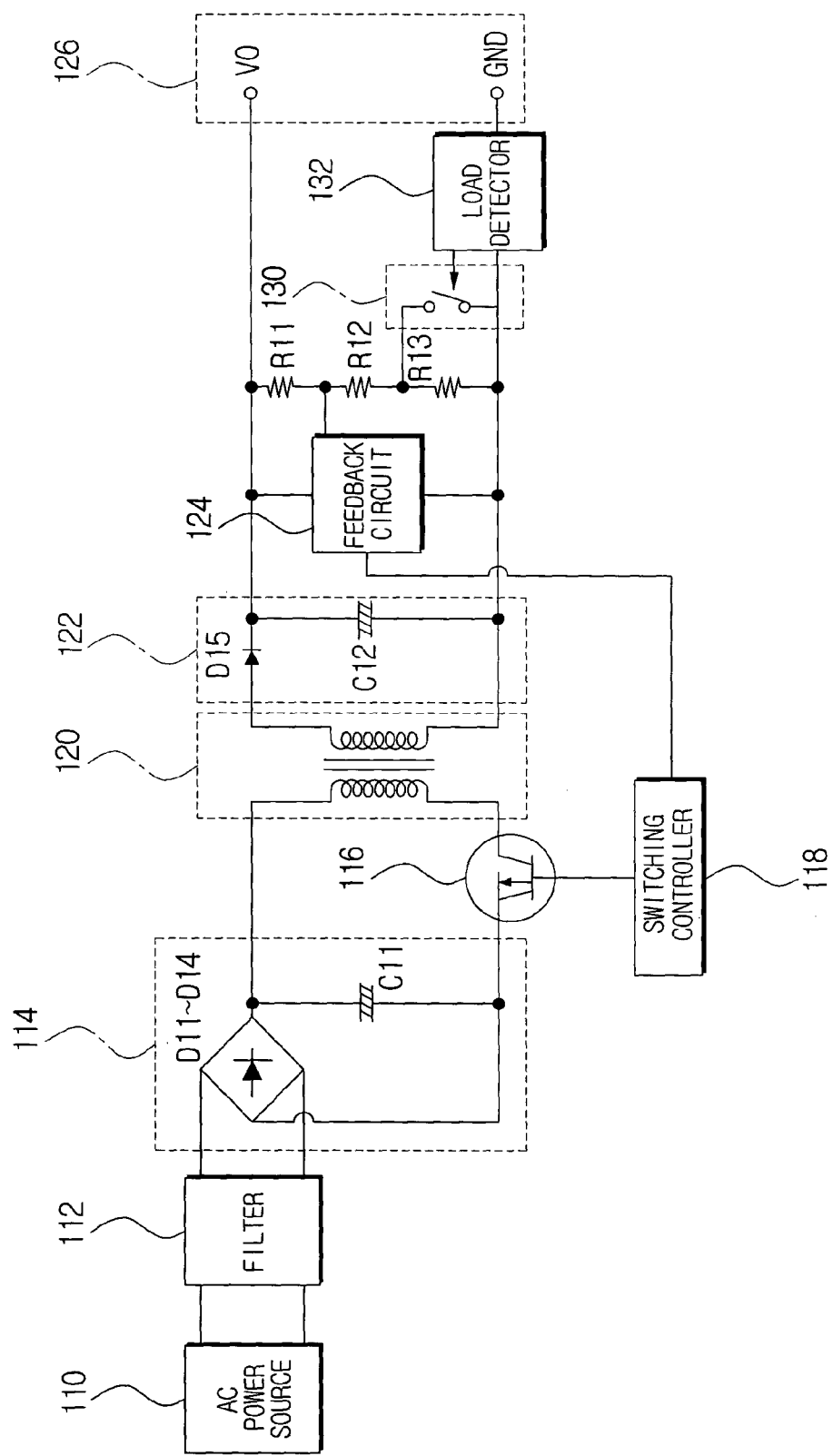
FIG. 2 is a block diagram for illustrating a power supply device having a spark prevention function according to the present invention.

FIG. 2 is a block diagram for illustrating a power supply device having a spark prevention function according to the present invention.

Referring to FIG. 2, the power supply device has a filter 112, a rectifier 114, a field effect transistor (FET) 116, a switching controller 118, a transformer 120, an output rectifier 122, a feedback circuit 124, output connectors 126, plural resistors R11, R12, and R13, a voltage-regulating switch 130, and a load detector 132.

The filter 112 supplies AC power to the rectifier 114, eliminating surge and noise voltages included in the AC power supplied from an AC power source 110. The rectifier 114 is constructed with bridge diodes D11~D14 and a capacitor C11 and rectifies AC power inputted through the filter 112. A voltage rectified by the rectifier 114 is applied to a primary coil of the transformer 120, and the transformer 120 induces a voltage across a secondary coil thereof through interactions of the primary and secondary coils. At this time, the switching controller 118 outputs a pulse width modulation (PWM) signal of certain pulse width. The FET 116 is turned on and off by the PWM signal so that currents flowing in the primary coil of the transformer 120 are controlled, to thereby control the induction of a voltage across the secondary coil of the transformer 120.

A voltage induced across the second coil of the transformer 120 is transferred to the output rectifier 122. The output rectifier 122 is constructed with a diode D15 and a capacitor C12, rectifies and smoothens the transferred voltage, and outputs the rectified voltage to the output connectors 126. Both ends of the plural resistors R11, R12, and R13 connected in series are connected in parallel to the output connectors 126 to which an external device (not shown) is coupled so as to be finally supplied with a dc voltage. At this time, the feedback circuit 124 detects an output voltage of the output rectifier 122 and feeds back the detected output voltage to the switching controller 118. The switching controller 118 modulates a pulse width of a PWM signal of the switching controller 118 based on a fed-back signal to control switching operations of the FET 116, to thereby constantly maintain a voltage value outputted from the output rectifier 122 to a certain level.

In the meantime, the plural resistors R11, R12, and R13, the voltage-regulating switch 130, and the load detector 132 constitute an output controller to control a voltage level outputted depending upon whether an external device is connected to the output connector 126.

In detail, the load detector 132 decides whether an external device is connected to the output connector 126. The decision on whether an external device is connected can be made by detecting currents or the like which flows when a closed circuit is formed with the external device connected to the output connectors 126. If the load detector 132 decides that an external device is connected to the output connectors 126, the load detector 132 switches off the voltage-regulating switch 130 connected in parallel to the resistor R13. If the voltage-regulating switch 130 is switched off, the resistors R11, R12, and R13 are connected in series so that a normal output voltage of certain level is outputted to the output connectors 126.

To the contrary, if the load detector 132 decides that an external device is not connected to the output connectors 126, the load detector 132 switches the voltage-regulating switch 130 on. With the voltage-regulating switch 130 on, the resistor R13 is short-circuited so that a resistance value is the same as in a case when only the resistors R11 and R12 are connected in series, since the voltage-regulating switch 130 is connected in parallel to the resistor R13. Accordingly, since an entire resistance value becomes smaller than a situation when the three resistors R11, R12, and R13 are connected in series, a voltage of lower level than a normal output voltage is outputted to the output connectors 126. At this time, the level of an voltage outputted to the output connectors 126 can be adjusted by properly selecting values of the respective resistors R11, R12, and R13. In an alternative embodiment, other means for reducing the entire resistance value known in the art is used.

In this state, even though an external device is connected to the output connectors 126, the occurrences of sparks can be prevented since a voltage of lower level than a normal output voltage is outputted to the output connectors 126 so that no large voltage difference is formed. Further, after an external device is connected to the output connectors 126, the external device can be supplied with a normal output voltage since the voltage-regulating switch 130 is switched off so that the normal output voltage is outputted to the output connectors 126.

As stated above, by the control of the output controller formed with the plural resistors R11, R12, and R13, the switch 130, and the load detector 132, a normal output voltage is outputted after an external device is connected to the output connectors 126, and a voltage of lower level than the normal output voltage is outputted before an external device is connected to the output connectors 126, so that sparks (arc) can be prevented which can occur at the instant the external device is connected. Accordingly, an external device can be connected to the output connectors 126 without any damage during the operations of a power supply device.

Even though descriptions have been made in which the voltage-regulating switch 130 is connected in parallel with the resistor R13 in the above embodiment, the voltage-regulating switch can be installed to at least any one of the plural resistors R11, R12, and R13. Further, descriptions have been made in which a power supply device is provided with one set of output connectors in the above embodiment, however, the same scheme can be applied when plural output connectors are provided.

As described above, according to the present invention, sparks occurring when an external device is connected to a power supply device in operation are prevented, so that damages to parts or malfunctions due to the spark occurrences can be prevented, and, accordingly, an external device can be coupled to a power supply device without switching off the operations of the power supply device.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A power supply device having a spark prevention function, comprising:

output connectors to which an external device is coupled to be supplied with electric power;

an output controller, which controls a level of a voltage outputted to the output connectors, for preventing the generation of sparks by determining a change of an electrical potential of the output connectors depending upon whether the external device is coupled to the output connectors;

a load detector which determines whether the external device is coupled to the output connectors and outputting a determination;

a resistor connected in parallel with the output connectors; and a switch which short circuits the resistor based on the determination of the load detector.

2. The power supply device as claimed in claim 1, wherein the output controller controls an output of a normal output voltage level to the output connectors after the external device is coupled to the output connectors, and controls an output of a lower voltage of a level lower than the normal output voltage level to the output connectors before the external device is coupled to the output connectors.

3. The power supply device as claimed in claim 2, wherein the output controller includes:

a load detector for deciding whether the external device is coupled to the output connectors and outputting a decision;

plural resistors connected in series, and a first end and a second end of said plural resistors connected in parallel with the output connectors; and a voltage-regulated switch for controlling at least one of the plural resistors to be short-circuited based on a result of the decision of the load detector.

4. The power supply device as claimed in claim 2, wherein the lower voltage of the level lower than the normal output voltage level is greater than zero.

5. The power supply device as claimed in claim 1 further comprising plural resistors connected in series, and a first end and a second end of said plural resistors connected in parallel with the output connectors, wherein the output controller, for controlling the level of the voltage, short-circuits at least one of the plural resistors to lower the level of the voltage outputted to the output connectors when the external device is not connected.

6. The power supply device as claimed in claim 1, wherein the switch short circuits the resistor if the determination of the load detector indicates the external device is coupled to the output connectors.

7. A power supply method having a spark prevention function, comprising steps of:

deciding whether an external device is coupled to output connectors supplying electric power and outputting a decision;

controlling a level of a voltage outputted to the output connectors to prevent the generation of sparks by determining a change of an electrical potential of the output connectors based on a result of the decision of the deciding step;

determining whether the external device is coupled to the output connectors and outputting a determination; and short circuiting a resistor connected in parallel with the output connectors, based on the determination.

8. The power supply method as claimed in claim 7, wherein the step of controlling the voltage level controls an output of a normal output voltage level to the output connectors after the external device is coupled to the output connectors, and controls an output of a voltage of a lower level than the normal output voltage level to the output connectors before the external device is coupled to the output connectors.

9. The power supply method as claimed in claim 7, wherein the lower voltage of the level lower than the normal output voltage level is greater than zero.

10. The power supply method as claimed in claim 7, wherein the short circuiting the resistor connected in parallel with the output connectors is performed if the determination indicates the external device is coupled to the output connectors.

11. A power supply device comprising:

output connectors to which an external device is coupled; and an output controller for preventing the generation of sparks, which controls a level of a voltage outputted to the output connectors depending upon whether the external device is coupled to the output connectors, the output controller comprising:

means for detecting a load to determine whether the external device is coupled to the output connectors;

plural resistors connected in series, and a first end and a second end of said plural resistors connected in parallel with the output connectors; and means for short-circuiting at least one of the plural resistors if the external device is not coupled to the output connectors.

* * * * *